United States Patent
Hakasalo et al.

(10) Patent No.: US 7,352,834 B2
(45) Date of Patent: Apr. 1, 2008

(54) CODE PHASE SYNCHRONIZATION

(75) Inventors: Timo Hakasalo, Oulu (FI); Risto Paatelma, Oulu (FI)

(73) Assignee: Nokia Corporation, Espoo (FI)

( * ) Notice: Subject to any disclaimer, the term of this patent is extended or adjusted under 35 U.S.C. 154(b) by 863 days.

(21) Appl. No.: 10/661,376

(22) Filed: Sep. 12, 2003

(65) Prior Publication Data
US 2005/0094716 A1  May 5, 2005

(30) Foreign Application Priority Data
Sep. 12, 2002 (EP) ................. 02020378

(51) Int. Cl.
*H04L 7/00* (2006.01)
(52) U.S. Cl. .................. 375/354; 375/316
(58) Field of Classification Search ............. 375/130, 375/147, 140–143, 150, 153, 316, 295, 354–357; 370/310, 342
See application file for complete search history.

(56) References Cited

U.S. PATENT DOCUMENTS

| 4,553,251 | A | * | 11/1985 | Hartmann | 375/365 |
| 6,049,535 | A | * | 4/2000 | Ozukturk et al. | 370/335 |
| 6,061,409 | A | * | 5/2000 | Moriya | 375/357 |
| 6,157,842 | A | * | 12/2000 | Karlsson et al. | 455/456.2 |
| 6,191,737 | B1 |  | 2/2001 | Havinis et al. | |
| 6,263,010 | B1 | * | 7/2001 | Naruse et al. | 375/130 |
| 6,292,519 | B1 | * | 9/2001 | Popovic | 375/346 |
| 2001/0014086 | A1 | * | 8/2001 | Jeong et al. | 370/335 |
| 2004/0044799 | A1 | * | 3/2004 | Sivaraman et al. | 709/253 |

FOREIGN PATENT DOCUMENTS

| EP | 0 896 437 | 2/1999 |
| WO | WO 00/70792 | 11/2000 |

* cited by examiner

*Primary Examiner*—Tesfaldet Bocure
*Assistant Examiner*—Vineeta Panwalker
(74) *Attorney, Agent, or Firm*—Ware, Fressola, Van Der Sluys & Adolphson, LLP

(57) ABSTRACT

The invention relates to a method for synchronizing the phase of a code available at a receiving unit with the phase of a corresponding code of which samples are received at said receiving unit. The synchronization comprises comparing a received code sample with different samples of the available code, the respective sample of the available code being shifted in phase for each comparison by a predetermined amount until a correspondence with the received code sample is determined or until an interrupt of the synchronization occurs. In order to accelerate the synchronization, it is proposed to continue the synchronization after an interrupt with a newly received code sample and with available code samples proceeding from the code phase of the available code reached in the synchronization before the interrupt. The invention relates equally to a corresponding receiving unit and to a communication system comprising such a receiving unit.

15 Claims, 3 Drawing Sheets

CODE PHASE SYNCHRONIZATION

CROSS-REFERENCE TO RELATED APPLICATIONS

This application claims priority under 35 U.S.C. §119 to European Patent Application No. 02 020 378.2 filed on Sep. 12, 2002.

FIELD OF THE INVENTION

The invention relates to a method for synchronizing the phase of a code available at a receiving unit with the phase of a corresponding code of which samples are received at the receiving unit as a channel response. The synchronization comprises comparing a received code sample with different samples of the available code, the respective sample of the available code being shifted in phase for each comparison by a predetermined amount until a correspondence with the received code sample is determined or until the synchronization is interrupted. The invention relates equally to a corresponding receiving unit and to a communication system comprising such a receiving unit.

BACKGROUND OF THE INVENTION

It is known from the state of the art that a receiving unit might have to synchronize the phase of an available code with the phase of a channel code received via the air interface, before it is able to make use of received signals. The channel code may be in particular a scrambling code, which is used e.g. in WCDMA (wideband code division multiple access) systems for enabling a receiving unit to distinguish between signals from different transmitting units. The synchronization can be performed by comparing a received channel code sample with a respective sample of the available code. In case no correspondence is determined in a correlation procedure, another sample of the available code, which is delayed by a predetermined value versus the first sample, is used for a new comparison.

Such a synchronization may be required for example in a location system which allows to determine the current geographic location of a mobile station within a communication system.

As mentioned in document U.S. Pat. No. 6,191,737 B1, the geographic location of a mobile station may be determined in a communication system based on measurements by the mobile station or based on measurements by a communication network of the communication system. A communication network supporting the determination of a location usually comprises so called local measurement units (LMU), which carry out radio measurements to support one or more positioning methods. An LMU may be realized as a radio receiver positioned at a known location and be able to communicate with radio transmitters of the network via a radio interface, similarly as a mobile station. It can be associated to a serving radio transmitter, but perform air interface measurements as well on signals transmitted by its serving radio transmitter as by neighboring radio transmitters. The radio transmitters of the network can be for instance base stations of a WCDMA network.

In case the location of a mobile station is to be determined based on measurements at the mobile station, first the timing difference between at least two pairs of radio transmitters of the communication network is determined by at least one LMU, if the transmission frames of the different base stations are not perfectly synchronized. The timing difference of the transmissions is determined based on time differences of arrival (TDOA) measured at the LMU and on the knowledge of the location of the LMU and of the radio transmitters. The timing difference can be determined either as relative timing difference (RTD) or as absolute timing difference (ATD) in case the LMU has the absolute time available.

In addition, the mobile station measures the TDOA of signals transmitted by the same pairs of radio transmitters. The TDOAs measured at the mobile station and the known timing difference of the at least two pairs of radio transmitters allow determination of a Geometrical Time Difference (GTD) to two radio transmitters respectively, the GTD being the time difference in transmission between two signals from two different radio transmitters to a single mobile station due to geometry. Since the locations of the radio transmitters are known, the knowledge of the GTDs then enables a determination of the current location of the mobile station.

While mobile stations usually have a code timing information from neighboring base stations, such information is not available for the LMU.

Therefore, the exact code phases of the signals from neighboring base stations have to be found by trial, before the LMU is able to perform RTD or ATD measurements. The trial has to be performed during an initial synchronization or if an already achieved synchronization has been lost again. In addition, the timing of neighboring base stations has to be tracked regularly, in order to avoid a loss of the signal.

In some cases, only short periods of time are available for the synchronization, because it is interrupted due to some reason. For downlink TDOA measurements, idle periods, down link (IPDL) are provided in a pseudorandom order, which prevent a communication in the downlink while allowing the mobile stations and LMUs to make timing measurements spanning 256-1025 chips. During an IPDL, a pilot signal from a neighboring base station comprising a channel code sample can be received at an LMU and stored in a sample RAM for the synchronization with this particular neighboring base station. When the LMU has to search new neighboring base stations while carrying out at the same time measurements for positioning purposes for various neighboring base station, the search algorithm for the new neighboring base stations has to be interrupted frequently.

After each interrupt, the search is started again with a new channel code sample received in another IPDL at the beginning of the corresponding code available in the LMU. In particular in the case of long codes, it may happen that a code synchronization cannot be achieved at all, if the interrupts occur too often. This problem is present, for example, when the currently proposed 3G LMU searches neighboring base stations of the network.

SUMMARY OF THE INVENTION

It is an object of the invention to accelerate the synchronization procedure at a receiving unit synchronizing the phase of a code available in the receiving unit with the phase of a received channel code in an interrupt impacted environment.

According to the invention, the synchronization of code phases is continued after an interrupt with a newly received code sample and with available code samples proceeding from the code phase of the available code reached in the synchronization procedure before the interrupt.

Further, a receiving unit is proposed which comprises means for providing an available code, means for receiving samples of a code via the air interface, and means for synchronizing the phase of the available code with the phase of a code of which samples are received by the means for receiving code samples via the air interface according to the proposed method. Equally, a communication system is proposed, which comprises such a receiving unit and a transmitting unit transmitting coded signals.

The invention proceeds from the idea that a synchronization of code phases at a receiving unit does not have to start anew from the very beginning after each interrupt. Instead, the results achieved before the interrupt for a received code sample provide utilizable information for a continued synchronization with new channel response samples received after this interrupt. More specifically, the code phases corresponding to samples of the available code that were already discarded before the interrupt can be discarded immediately after the interrupt without any comparison. It only has to be taken care that the respective code phases proceed for the new channel code samples from a shifted available code, where the amount of shifting corresponds to the time elapsed after the reception of the previous channel code samples.

It is an advantage of the invention that it minimizes the amount of search attempts for a synchronization. At the same time, it significantly increases the probability that a synchronization is achieved at all.

Preferred embodiments of the invention become apparent from the dependent claims.

In order to be able to proceed from the code phase employed in the synchronization process before the interrupt, the shifting position of the available code has to be adjusted to the time of reception of the received new code sample. A specific code phase of the available code after an interrupt, e.g. a code phase of zero, can be determined for example by shifting the available code employed before the interrupt by an amount corresponding to the time elapsed between the time of reception of the last code sample before the interrupt and the time of reception of the new code sample after the interrupt.

The synchronization should not only be ended when the synchronization was successful, but also when a comparison has been carried out without success for all code phases that can be reached with predetermined shifts.

However, it is proposed that the synchronization is not ended immediately after the code phase of the available code has been shifted by a specific predetermined amount until code samples spanning the entire code have been checked without success. Rather, the code phase should then be shifted once by a different predetermined amount for a further round of comparison calculations. This ensures that in case of a comparison by a correlation, in which a peak is not detected since it lies on a sample border, the peak is shifted away from the border for a second round of comparison calculations.

In a preferred embodiment of the invention, the code samples are received at the receiving unit from a communication network in form of a pilot signal during an Idle Period, Down Link (IPDL).

In order to make a received code sample available for a comparison with several available code samples, the received code sample is stored in a further preferred embodiment of the invention in a dedicated random access memory (RAM), from which it is retrieved for the respective synchronization calculations.

The comparison is preferably carried out by a matched filter performing correlation calculations on a respective pair of received and available code samples.

The invention can be employed for a code synchronization in real time systems.

It can be employed in particular, though not exclusively, in a TDOA based location system in a continuously transmitting communication system with random interrupts. Such a continuously transmitting communication system can be for instance a WCDMA system, while the interrupts may be caused due to measurements required during the synchronization.

Further, the invention can be implemented in particular, though not exclusively, in an LMU or in a mobile station of a location system.

BRIEF DESCRIPTION OF THE FIGURES

Other objects and features of the present invention will become apparent from the following detailed description of an embodiment of the invention considered in conjunction with the accompanying drawings, wherein.

DETAILED DESCRIPTION OF THE INVENTION

Figure 1:
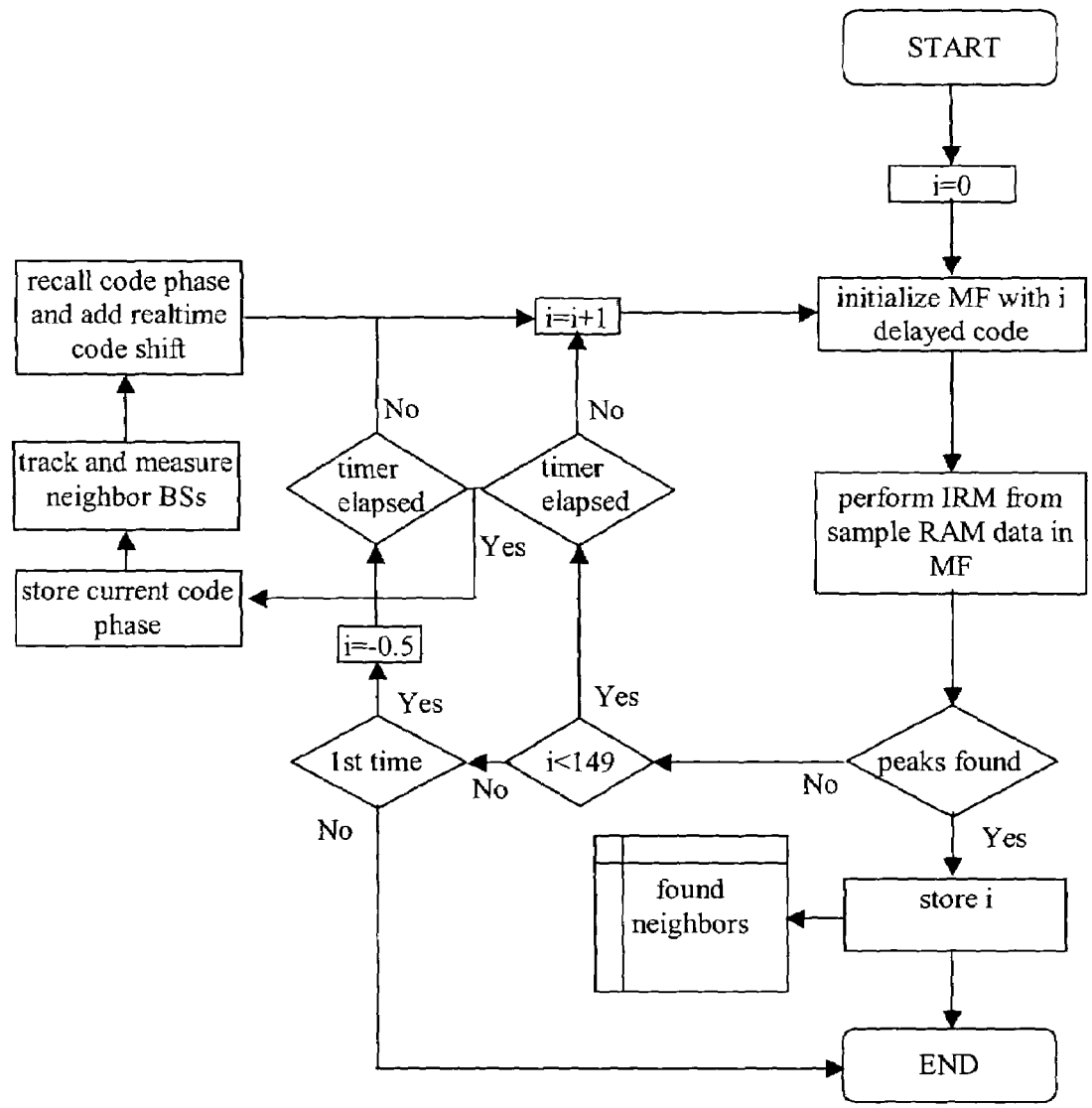
FIG. 1 is a flow chart illustrating an embodiment of the method according to the invention.

FIG. 1 presents a flow chart of a minimum time maximum likelihood (MTML) search algorithm which is implemented in an LMU for realizing an embodiment of the method according to the invention.

The LMU is part of a WCDMA communication system and is designed to support a determination of the current location of mobile stations based on measurements at these mobile stations. To this end, the LMU determines the RTD between the codes transmitted by several neighboring base stations of the WCDMA communication system, as explained above. Before the RTD values can be determined, the LMU has to synchronize the phase of scrambling code samples received during IPDLs from the base stations with the phase of an associated available scrambling code.

In the LMU, a scrambling code is available for each neighboring base station from which the LMU might have to receive signals. A corresponding scrambling code is applied in the associated base station to the transmitted signals. The channel response is recorded to a sample RAM of the LMU during an IPDL period, and the LMU tries to detect neighbor base stations from samples in this sample RAM. The sample RAM is filled with new samples of the channel response every time when needed during IPDLs. It is assumed for the presented embodiment that each scrambling code has a length of one frame, which corresponds to 38400 chips. It is further assumed that a matched filter using a window of 256 chips is employed for comparing a received channel code sample with delayed stored code samples, in order to find a synchronization of the code phases. It therefore takes a maximum of 150 searches to find the synchronization for one neighbor. When the matched filter processes 3.84 Mchips/s and 10 symbols of 256 chips each are integrated in the hardware of the LMU, it takes 0.1 s to perform 150 searches without system overhead.

The algorithm presented in FIG. 1 ensures that synchronization can be found quickly and reliably even in case of interrupts having a frequency far above once per 0.1 S.

For the synchronization with a specific base station, in a first step, a delay value i is set to i=0.

In a second step, the matched filter MF is initialized with a sample of the stored specific neighbor code having a delay value of i. One delay step is defined here to comprise 256 chips.

In a third step, the matched filter performs an impulse response measurement (IRM) from the data currently stored in the sample RAM for detecting and retrieving the desired channel code sample. The channel code sample comprises 8-10 coherent symbols. The matched filter then compares the code sample of the LMU having a delay value of i with the code sample retrieved from the sample RAM using a correlation procedure.

In a fourth step, it is checked whether a peak was found in the correlation procedure due to matching samples.

In case a peak was found, synchronization is achieved and the delay value i resulting in the peak is stored in a fifth step in a table indicating the respective correct delay for all found neighbor base stations. The procedure can then be ended.

However, in case no peak was found in the correlation procedure, it is first checked whether the currently set delay value i lies below 149.

In case the currently set delay value i lies below 149, this is an indication that the search has not yet been performed for all possible integer delay values and that the search should be continued. Before continuing the search, though, it is checked whether a clock drift timer has elapsed in the meantime.

For each synchronized neighboring base station, the timing has to be tracked regularly with the respectively determined delay value stored in the above mentioned table, in order not to lose the signal again from the MF window. For each neighboring base station for which synchronization was already achieved, a dedicated timer is therefore provided, which defines a tracking frequency for the respective neighboring base station. Each of these timers generates tracking flags after elapsing, in order to interrupt the ongoing synchronization procedure for a new base station. The tracking frequency is determined based on a ranking of the range measurements for the already found neighboring base stations. Such a ranking is required for the case that there is a large amount of neighboring base stations that have already been found. Without a prioritization, the synchronization with all base stations may be lost, since the tracking is not carried out often enough.

In case it is determined that none of the provided clock drift timers generated a flag, the delay value i is incremented by one. Then, steps two to five described above are repeated with the new delay value i. In step three, the same channel code sample as before is retrieved from the sample RAM and used by the matched filter.

In case it is determined, in contrast, that one of the provided clock drift timers generated a flag, the synchronization procedure is interrupted.

Upon such an interrupt, the current code phase is stored in the LMU. Then, all neighboring base stations for which a flag was generated are tracked and measured during the following IPDL, in order to keep their synchronization. If needed, the channel response can be stored to the sample RAM in order to keep samples fresh. After that, the stored code phase is recalled. If no new samples were stored to the sample RAM, the trial is directly continued from the stored code phase and no any code shift is needed. If new channel response samples were stored during the IPDL after the interrupt, a phase shift is added which takes into account the time difference between the available code phase before the interrupt and the reception of the new channel code sample after the interrupt. The IPDL positions can be calculated, since they are pseudorandomly defined only then, the delay value i is incremented by one, and steps two to five are carried out again with the new code phase and the new delay value. In case a new channel response is stored in the sample RAM, in step three a new channel response sample is retrieved from the RAM.

In case it is determined in step four of one of the correlation calculation rounds that that no peak was found, and subsequently that the currently set delay value i is at least 149, it is checked whether this limit was exceeded for the first time during the present synchronization procedure.

In case the delay value i reaches the limit of 149 only for the first time, it is set to i=−0.5.

Next, it is checked next whether any of the clock drift timers mentioned above have elapsed in the meantime.

In case it is determined that none of the clock drift timers elapsed, the delay value i is incremented by one and steps two to five are repeated proceeding from the new delay value i. Thus, the entire procedure described above is repeated with a shift of half a symbol beginning with a delay value of i=0.5. Half symbol shifting is performed once for the synchronization of a specific base station, in case a synchronization is not found with integer delay values. This half symbol shift takes care of the possibility that a peak resulting in the correlation with the matched filter may lie on the slot- or symbol border so that the peak is not recognized. After the half symbol shift, the peak is moved into the middle of the matched filter window.

In case it is determined after setting the delay value to −0.5 that one of the clock drift timers generated a flag, in contrast, the synchronization procedure is first interrupted.

The procedure following the interrupt corresponds to the above described interrupt procedure, in which already synchronized neighboring base stations are tracked and measured.

In case it is determined after the fourth step of a correlation round that the delay value i reaches the limit of 149 already for the second time, it becomes apparent that all possible integer and non-integer delay values were checked for the specific neighboring base station and that the synchronization procedure failed. The synchronization procedure is thus ended.

With the algorithm presented in FIG. 1, a possible flag output by one of the clock drift timers is checked once after each MF correlation calculation round based on a different delay value i. This corresponds to a check about once in 1 ms.

Nevertheless, the algorithm minimizes the amount of search attempts, since already measured code phase correlation results are reused such that a synchronization does not have to start from the beginning of the scrambling code with every IPDL sample after an interrupt.

The principle of the synchronization according to the invention will now be described in more detail for a simplified example with reference to FIG. 2.

Figure 2:
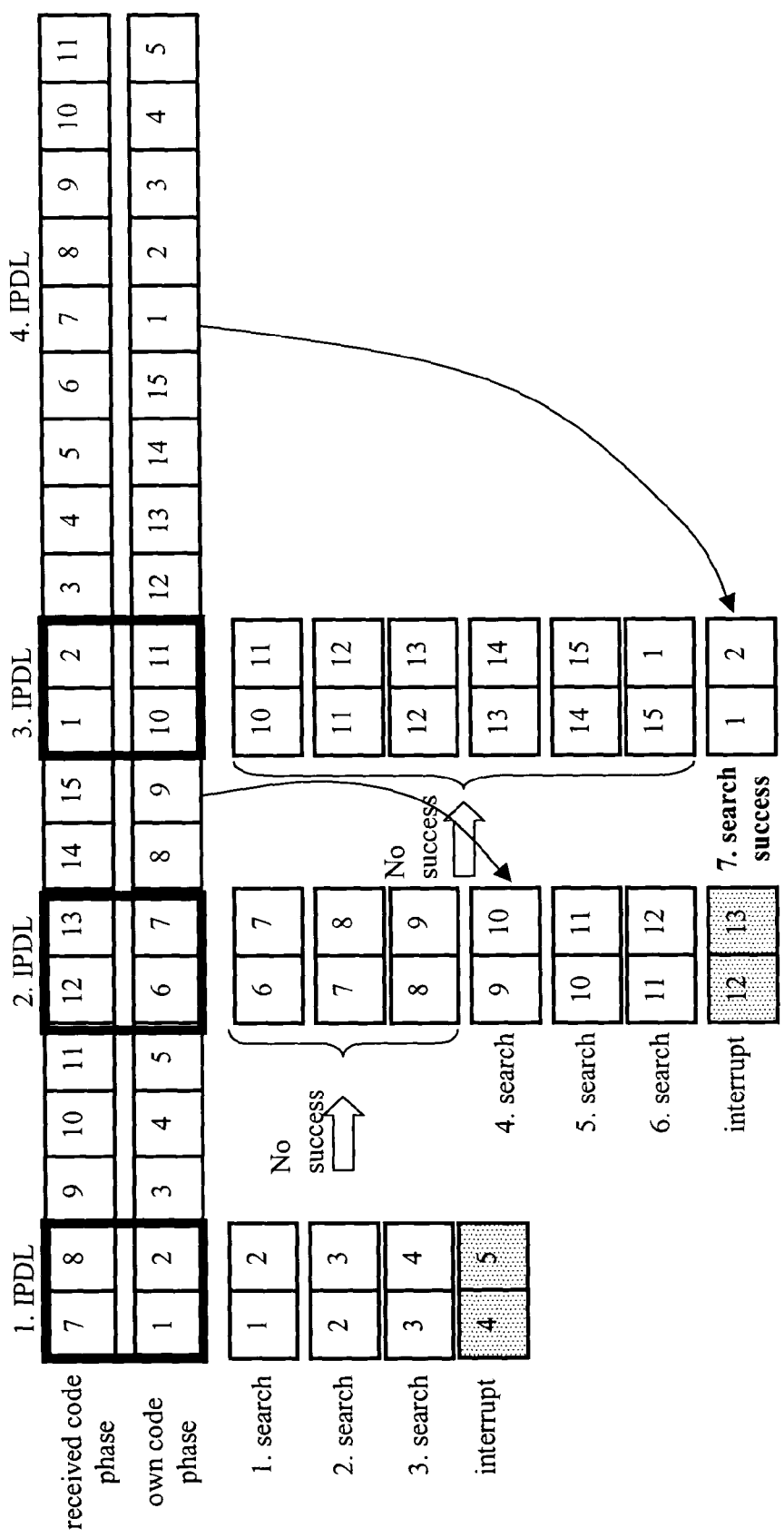
FIG. 2 illustrates by way of example and in principle the synchronization in the embodiment of the method according to the invention of FIG. 1.

FIG. 2 presents in a first row the scrambling code employed by a base station for transmitting signals to the LMU. The code is represented by a cycling numbering from 1 to 15, beginning with 7. FIG. 2 presents in a second row a scrambling code available in the LMU for this particular base station. The code is represented by a cycling numbering from 1 to 15, beginning with 1. The received scrambling code samples and the available scrambling code thus have a phase difference of "6". It is now an aim of the LMU to determine this phase difference, in order to be able to bring the available code into the same phase as the received channel code.

The LMU receives samples of the scrambling code during IPDLs. In FIG. 2, three IPDLs are indicated by frames surrounding the corresponding samples of the received channel code and of the available code. Correlation calculations relating to the channel code sample received in one of the IPDLS are indicated below the respective IPDL frame.

During a first IPDL, the LMU receives a channel code sample [7,8] and stores it in a sample RAM. In order to synchronize the phase of the available code, the LMU correlates delayed samples of the available code with the received sample by means of a matched filter.

First, the LMU correlates a sample [1,2] of the available code corresponding to a delay value of i=0 with the received code sample [7,8], but no peak is obtained in the correlation, indicating that the samples do not match. Next, the LMU correlates a sample [2,3] of the available code corresponding to a delay value of i=1 with the received code sample, but again no peak is obtained in the correlation. Then, the LMU correlates a sample [3,4] of the available code corresponding to a delay value of i=2 with the received code sample. Still no peak is obtained in the correlation.

Now, the search procedure is interrupted for a tracking and measuring process. Therefore, the next sample [4,5] of the available code corresponding to a delay value of i=3 cannot be checked any more. The current code phase of the available code is stored, and the already synchronized neighboring base stations are tracked and measured. Thereafter, the stored code phase is retrieved again, and a real time code shift in chips corresponding to the time which passed between the reception of the last channel code sample [7,8] in the first IPDL and the reception of a new channel code sample [12,13] in a second IPDL occurring after the interrupt is applied to the retrieved code phase. Thereby, it is ensured that the delay value of i=0, which corresponds for the first IPDL to sample [1,2] of the available code, corresponds for a second IPDL to sample [6,7] of the available code.

After the interrupt, the new channel code sample [12,13] received during the second IDPL is stored in the sample RAM.

In the conventional method, the LMU would now start comparing this new code sample with available code sample [6,7] corresponding to a delay value of i=0.

The proposed method, however, makes use of the fact that the relative difference between the received scrambling code samples and the available scrambling code remains the same after an interrupt. Since delays with the values i=0, 1 and 2 were already checked for the first IPDL, the first three shifted code samples [6,7], [7,8], [8,9] of the available scrambling code are not compared with the channel code samples received in the second IPDL. Instead, the trial is continued directly with sample [9,10] of the available scrambling code, corresponding to a delay of i=3. This is realized by the above mentioned real time code shift and by a further increment of the delay value i by one. The correlation for this sample as well as for the next two available code samples [10,11] and [11,12] corresponding to a delay of i=4 and i=5, respectively, are without success.

Then, another interrupt is received. The current code phase is stored as before, and the already synchronized neighboring base stations are tracked and measured. Thereafter, the stored code phase is retrieved again, and a real time code shift in chips corresponding to the time which passed between the reception of the last channel code sample [12,13] in the second IPDL and the reception of a new channel code sample [1,2] in a third IPDL occurring after the interrupt is applied to the retrieved code phase. Thereby, it is ensured that the delay value of i=0, which corresponds for the second IPDL to sample [6,7] of the available code, corresponds for a third IPDL to sample [10,11].

After the interrupt, the new channel code sample [1,2] received during the third IDPL is stored. Since delays values of i=0-6 were already checked for the first and the second IPDLs, corresponding for the third IPDL to the samples [10,11], [11,12], [12,13], [13,14], [14,15] and [15,1] of the available code, a trial is started with a delay of i=7, corresponding to the available code sample [1,2]. The code phase of the available scrambling code when delayed by i=7 is found to match with the code phase of the received channel code sample. The corresponding delay value of i=7 is stored for this neighboring base station in a table.

A fourth IPDL indicated in FIG. 2 is thus not required for the synchronization.

As becomes apparent, time is saved and the risk that the synchronization is not found at all is avoided.

The signal gain and the right decision probability is improved in the MTML by integrating various same phase different time IPDL responses, and after that the process is moved to the following phase.

Figure 3:
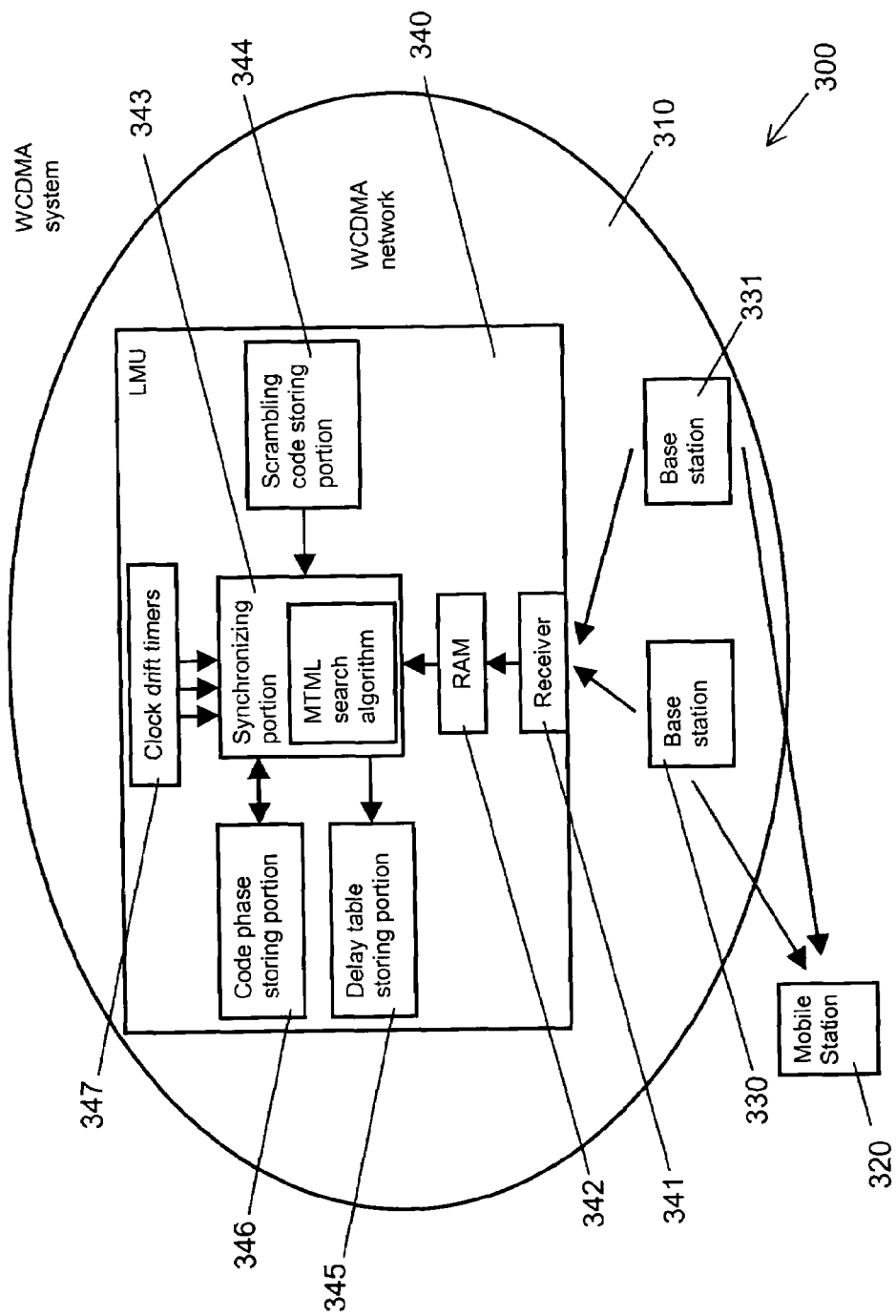
FIG. 3 shows a communication system in which the embodiment of the method according to the invention of FIG. 1 can be employed.

FIG. 3 schematically presents a WCDMA communication system 300 as a mobile communication system in which the above described method can be employed.

The WCDMA communication system 300 comprises a WCDMA network 310. In addition, it may comprise a mobile station 320, of which the current location is to be determined.

The WCDMA communication network 310 comprises several base stations 330, 331 as transmitting units and an LMU 340 as a receiving unit.

The LMU 340 includes a receiver 341, which is connected via a RAM 342 to a synchronizing portion 343. In the synchronizing portion 343, the MTML search algorithm illustrated in FIG. 1 is implemented. A scrambling code storing portion 344 is equally connected to the synchronizing portion 343. The scrambling code storing portion 344 stores all scrambling codes used by neighboring base stations 330, 331. Moreover, a delay table storing portion 345, a code phase storing portion 346 and the above mentioned clock drift timers 347 are connected to the synchronizing portion 343.

The LMU 340 receives scrambling code samples from a respective neighboring base station 330, 331 via the receiver 341 and stores the received samples in the RAM 342. The RAM 342 provides the samples to the synchronizing portion 343. Further, scrambling code samples stored for the respective base station 330, 331 in the scrambling code storing portion 344 are provided to the synchronizing portion 343.

The MTML search algorithm in the synchronizing portion 343 performs a synchronization between the received samples and the samples from the scrambling code storing portion 344 for determining the code phase between these samples as described above with reference to FIG. 1. During the synchronization process, the synchronizing portion 343 receives tracking flags from the clock drift timers 347, which interrupt the synchronization process, and stores the last checked code phase during an interrupt in the code phase storing portion 346 for being able to continue the synchronization process after the interrupt starting from this code phase.

The synchronizing portion 343 uses the delay table storing portion 345 for storing the finally determined code phase for each neighboring base station 330, 331 in a table.

The synchronizing portion 343, the RAM 342, the delay table storing portion 345 and the code phase storing portion 346 thus form exemplary means for synchronizing the phase of an available code with the phase of a code of which samples are received via the air interface in accordance with the invention, while the scrambling code storing portion 344 forms means for providing an available code, and the receiver 341 forms means for receiving samples of a code via the air interface in accordance with the invention.

The code phases stored for various neighboring base stations 330, 331 in the code phase storing portion 345 can then be used for example for determining the RTD between respectively two base stations. Such an RTD can be employed for example for determining the current location of a mobile station 320 in a known manner based on measurements at this mobile station 320 on signals received from the same two base stations 330, 331.

It is to be noted that the described embodiment constitutes only one of a variety of possible embodiments of the invention.

The invention claimed is:

1. A method for synchronizing the phase of a code available at a receiving unit with the phase of a corresponding code of which samples are received at said receiving unit, comprising:
    comparing said received code sample with different samples of said available code at said receiving unit, and
    shifting the respective sample of said available code in phase for each comparison by a predetermined amount until a correspondence with said received code sample is determined or until a measurement related interrupt of said synchronization occurs,
    wherein said synchronization is continued after the measurement related interrupt with a newly received code sample and with available code samples proceeding from the code phase of said available code reached in said synchronization before said measurement related interrupt shifted by an amount corresponding to the time elapsed between the time of reception of the last code sample before said measurement related interrupt and the time of reception of the new code sample after said measurement related interrupt.

2. The method according to claim 1, wherein said code phase of said available code is shifted by a first predetermined amount until code samples spanning the entire code have been checked, and wherein, in case no correspondence between said received code sample and an available code sample is determined with the resulting code phases, said code phase is shifted once by a different predetermined amount for further comparisons.

3. The method according to claim 2, wherein said code samples are received at said receiving unit by a communication network in form of a pilot signal during an Idle Period, Down Link.

4. The method according to claim 3, wherein said received code sample is stored in a dedicated random access memory, from which it is retrieved for said synchronization calculations.

5. The method according to claim 4, wherein said comparison is carried out by a matched filter performing correlation calculations on a respective pair of received and available code samples.

6. The method according to claim 1, wherein said synchronization is equally ended when a comparison has been carried out without success for all code phases that can be reached with predetermined shifts.

7. The method according to claim 1, wherein said code phase of said available code is shifted by a first predetermined amount until code samples spanning the entire code have been checked, and wherein, in case no correspondence between a received code sample and an available code sample is determined with the resulting code phases, said code phase is shifted once by a different predetermined amount for further comparisons.

8. The method according to claim 1, wherein said code samples are received at said receiving unit by a communication network in form of a pilot signal during an Idle Period, Down Link.

9. The method according to claim 1, wherein said received code sample is stored in a dedicated random access memory, from which it is retrieved for said synchronization calculations.

10. The method according to claim 1, wherein said comparison is carried out by a matched filter performing correlation calculations on a respective pair of received and available code samples.

11. A receiving unit, comprising:
    means for providing an available code;
    means for receiving samples of a code via the air interface; and
    means for synchronizing a phase of said available code with a phase of the received code sample;
    wherein said means for synchronizing are for comparing said received code sample with different samples of said available code; wherein said means synchronizing are for shifting the respective sample of said available code in phase for each comparison by a predetermined amount until a correspondence with said received code sample is determined or until a measurement related interrupt of said synchronization occurs; and
    wherein said synchronization is continued after the measurement related interrupt with a newly received code sample and with available code samples proceeding from the code phase of said available code reached in said synchronization before said measurement related interrupt shifted by an amount corresponding to the time elapsed between the time of reception of the last code sample before said measurement related interrupt and the time of reception of the new code sample after said measurement related interrupt.

12. The receiving unit according to claim 11, which is a location measurement unit for a location system.

13. A mobile communication system, comprising:
    a transmitting unit for transmitting a coded signal, and
    a receiving unit comprising:
        a storing portion for providing an available code,
        a receiver for receiving samples of a received code via an air interface, and
        a synchronizing portion for synchronizing a phase of said available code with a phase of the received code sample,
    wherein said synchronizing portion is configured to compare said received code sample with different samples of said available code,
    wherein said synchronizing portion is configured to shift the respective sample of said available code in phase for each comparison by a predetermined amount until a correspondence with said received code sample is determined or until a measurement related interrupt of said synchronization occurs, wherein said synchronization is continued after the measurement related interrupt with a newly received code sample and with available code samples proceeding from the code phase of said available code reached in said synchronization before said measurement related interrupt shifted by an amount corresponding to the time elapsed between the time of reception of the last code sample before said measurement related interrupt and the time of reception of the new code sample after said measurement related interrupt.

14. The mobile communication system according to claim 13, which is a wideband code division multiple access system.

15. A receiving unit, comprising:
a storing portion for providing an available code,
a receiver for receiving samples of a received code via an air interface, and
a synchronizing portion for synchronizing a phase of said available code with a phase of the received code sample, wherein said synchronizing portion is configured to compare said received code sample with at least one sample of said available code, wherein said synchronizing portion is configured to shift the respective sample of said available code in phase for each comparison by a predetermined amount until a correspondence with said received code sample is determined or until a measurement related interrupt of said synchronization occurs, wherein said synchronization is continued after the measurement related interrupt with a newly received code sample and with available code samples proceeding from the code phase of said available code reached in said synchronization before said measurement related interrupt shifted by an amount corresponding to the time elapsed between the time of reception of the last code sample before said measurement related interrupt and the time of reception of the new code sample after said measurement related interrupt.

* * * * *